Feb. 16, 1965   R. L. JAESCHKE   3,170,079
COUPLING APPARATUS
Filed July 17, 1962   2 Sheets-Sheet 1

INVENTOR.
RALPH L. JAESCHKE
BY *Williams, David,*
*Hoffmann & Yount*
ATTORNEYS

Feb. 16, 1965  R. L. JAESCHKE  3,170,079
COUPLING APPARATUS
Filed July 17, 1962  2 Sheets-Sheet 2

INVENTOR.
RALPH L. JAESCHKE
BY Williams, David,
Hoffmann & Yount.
ATTORNEYS

_United States Patent Office_

3,170,079
Patented Feb. 16, 1965

3,170,079
COUPLING APPARATUS
Ralph L. Jaeschke, Kenosha, Wis., assignor to Eaton Manufacturing Company, Cleveland, Ohio, a corporation of Ohio
Filed July 17, 1962, Ser. No. 210,380
10 Claims. (Cl. 310—105)

The present invention relates to electromagnetic devices and, more particularly, to air cooled electromagnetic couplings for transmitting driving torque to a shaft and having a field coil and a control mechanism therefor controlling the energization of the field coil.

The principal object of the present invention is the provision of a new and improved electromagnetic device, as above noted, wherein the construction and relationship of the component parts result in a simple, compact assembly in which heat generated by the control mechanism is effectively dissipated so that it does not adversely affect the operation of the device.

A further object of the present invention is the provision of a new and improved electromagnetic device, as noted in the next preceding paragraph, wherein the control mechanism therefor is mounted in a closed, and preferably air-tight, compartment including in part, a member forming a heat sink for certain control components and having cooling surface means for dissipating heat generated by the control components.

Another object of the present invention is the provision of a new and improved air cooled electromagnetic coupling wherein shaft means of the coupling is rotatably supported by housing cover means on which control components are mounted and which cover means has fins positioned in the path of flow of air for cooling the coupling members for dissipating heat generated by the control components.

A still further object of the present invention is the provision of an electromagnetic coupling having a housing and control means located in an airtight enclosure supported at one end of the housing for shielding the control means from contact by dust, water, oil or other foreign matter.

Other objects and advantages of this invention will be apparent from the following detailed description thereof made with reference to the accompanying drawings forming a part of this specification, in which.

Figure 1:
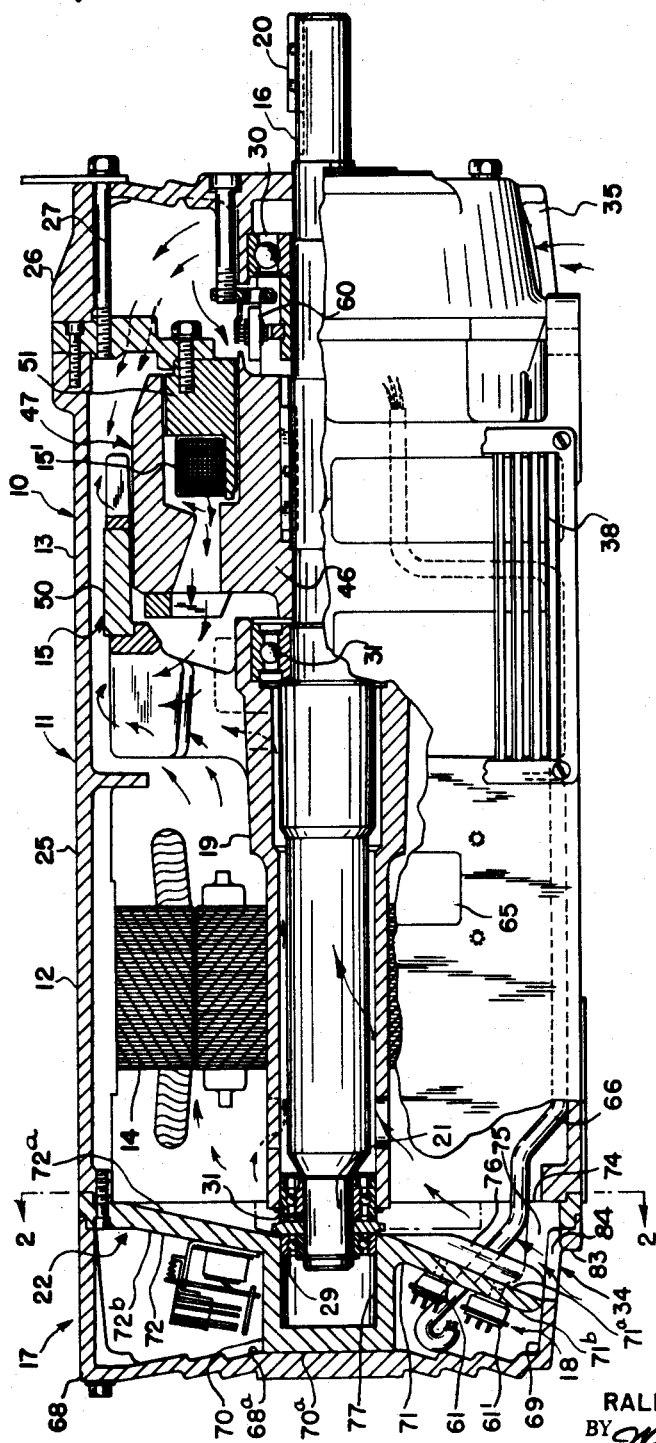
FIG. 1 is an elevational view, partly in longitudinal section, illustrating a coupling unit embodying the present invention.
Figure 2:
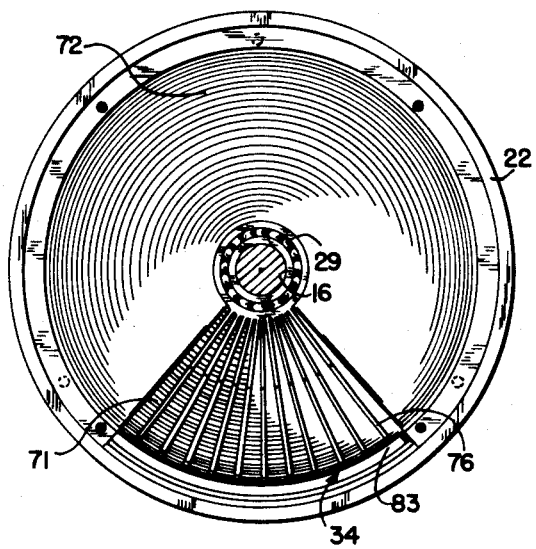
FIG. 2 is a vertical sectional view taken through the unit of FIG. 1 on section line 2—2 thereof.

The accompanying drawings illustrate the present invention by way of example, as embodied in a motor driven coupling unit 10, comprising a housing 11 having a motor section 12 and a coupling section 13 therein in an axially adjacent relationship. The motor section 12 contains a conventional electric drive motor 14 having stator and rotor members, and the coupling section 13 contains an electromagnetic coupling 15 including a field coil 15' and through which the power output of the motor 14 is transmitted to a driven power output shaft 16. A closed conrol compartment or enclosure 17 is provided on the end of the housing 11 adjacent the motor section 12 and includes control components generally designated 18 for controlling the energization of the field coil 15'.

The unit 10 also comprises a driving shaft member 19 coaxial with driven shaft member 16 and comprising a hollow shaft or quill disposed in a surrounding relation to the shaft member 16 and forming the rotor shaft of the electric motor 14. The shaft member 19 is operatively connected to the electromagnetic coupling 15 which transmits torque from the motor 14 to the shaft 16. The power output shaft 16 has right and left end portions 20 and 21, respectively, as viewed in the drawings. The right end portion 20 projects from the housing 11 and is adapted to be connected with the load to be driven while the left end portion 21 is suitably supported by an inner cover member 22 which supports the control components 18 and forms a part of the control compartment 17.

The housing 11 comprises an elongated stationary hollow body member 25 adapted to stand on a support or floor with the control enclosure 17 secured to the left end of the body member, as viewed in FIG. 1, and a suitable end member or cover 26 connected to the right end of the body member by suitable connecting screws 27. Support bearings 29 and 30 of the antifriction type are supported by the inner cover member 22 and the cover member 26, respectively, and rotatably support the shaft 16. Intermediate bearings 31 of the antifriction type are mounted on the shaft 16 at intermediate points thereof and support the opposite ends of the hollow shaft 19.

The housing 11 is provided with a plurality of air inlet openings 34, 35, respectively, for admitting cooling air thereinto at opposite ends thereof. The air flows past or through the various operating parts of the device to dissipate heat produced therein. The body member 25 is provided with suitable air outlet openings at opposite sides thereof for the discharge of air from the housing 11. These air outlet openings are provided with louvered covers 38, only one of which is shown in the drawings. The flow of cooling air within the housing 11 is indicated on the drawings by arrows and will be described more in detail hereinbelow.

The electromagnetic coupling 15 comprises a first or inner rotor 46 connected with the output shaft 16 and carrying an annular series of pole members 47 and a second outer rotor 50 connected with the inner end of the hollow shaft 19. The annular field coil 15' of coupling 15 is disposed in a surrounding coaxial relation to the shaft 16 and a portion of the inner rotor 46. The coil 15' is here shown as supported by a stationary annular member 51 mounted on the cover 26. The coupling 15 is similar as to construction and manner of operation to the electromagnetic coupling disclosed in Patent No. 3,012,160, issued December 5, 1961, wherein an electromagnetic coupling of this type is described in greater detail.

Figure 3:
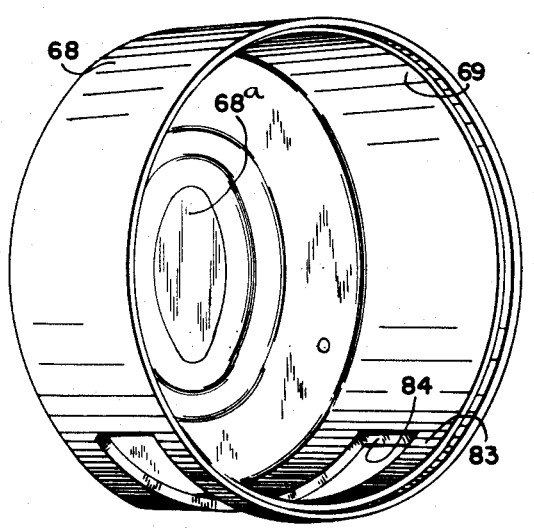
FIG. 3 is a perspective view showing a cover element of the coupling housing in a detached relation.
Figure 4:
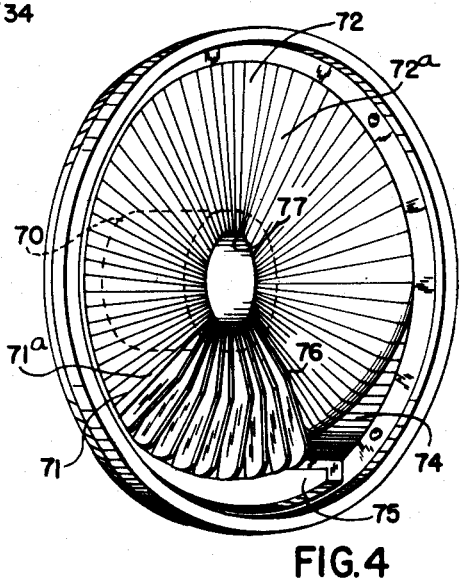
FIG. 4 is a perspective view of the control support member with which the cover element of FIG. 4 cooperates to provide the control compartment.

The degree of excitation of the field coil 15' determines the degree of coupling action between the inner rotor 46 and outer rotor 50 and thereby determines the rotational speed of the shaft 16. A suitable control circuit means 55 including components 18 is provided to control the energization of field coil 15' and in turn the speed of the shaft 16. A typical control circuit means 55 is illustrated in FIG. 3, and the operation of the control circuit is fully disclosed and described in Patent No. 2,850,654, issued September 2, 1958.

In general the control circuit means 55 includes the aforementioned control components 18 and an electrical generator means 60 of a conventional form driven by shaft 16 and which develops an electrical potential which is a function of the angular velocity of the shaft 16. The generator means 60 is preferably an A.C. permanent magnet alternator and can be conveniently referred to as a speed indicating or tachometer generator. The control components 18 include transistor means 61 and a potentiometer 62 which is settable to preselect the speed at which the shaft 16 is to be rotated. Adjustment of the potentiometer to the position indicating the desired shaft speed impresses a D.C. potential across the base emitter circuit of the transistor 61. This causes a current to flow in the base emitter circuit and the resulting current which is thereby caused to flow in the collector emitter circuit will energize field coil 15'.

Figure 5:
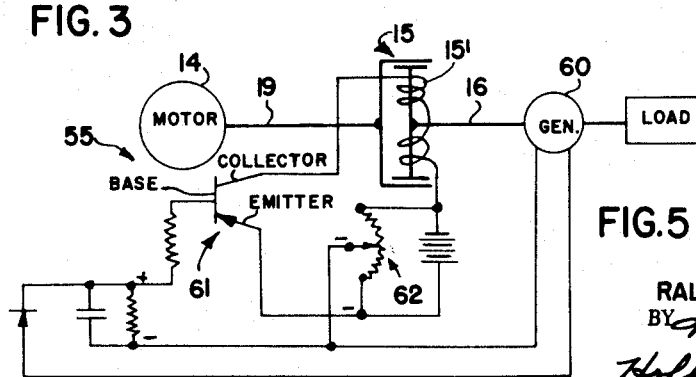
FIG. 5 is a schematic electrical diagram illustrating a control mechanism which may be embodied in the coupling unit of FIG. 1.

As the shaft 16 rotates and the angular velocity thereof increases, the D.C. potential component produced by generator 60 increases. As the polarity of this latter component opposes that established by the potentiometer the negative bias on the base of the transistor 61 is decreased until a steady state of operation results with the value of the field coil current at a predetermined level and the speed of the shaft 16 at a corresponding value. Any incipient variation in load conditions will be reflected in the base emitter circuit as increased or decreased base current and thereby increase or decrease the degree of coupling accordingly so as to maintain automatically the angular velocity of the shaft 16 substantially constant at the pre-established level determined by the setting of the potentiometer. Variation in the speed of the shaft 16 to a higher or lower preset value can be accomplished merely by a corresponding adjustment of the potentiometer. While the transistor means in circuit means 55, illustrated in FIG. 5 includes a single transistor 61, other circuit means may be employed in which the transistor means include a plurality of transistors and FIG. 1 illustrates a plurality of transistors 61, 61' mounted in the control compartment 17.

The potentiometer 62 is preferably mounted on the housing 11 on a portion thereof designated 65, in FIG. 1, so that it is readily accessible for selecting the desired shaft speed. The generator 60 is suitably mounted near the right end portion 20 of the shaft 16 and is associated therewith in a conventional manner to produce a current proportional in magnitude to the angular velocity of the shaft 16. A suitable conductor harness 66 connects the various control components and is merely shown diagrammatically in FIG. 1 to indicate its presence and general location in the housing 11.

As aforementioned, certain of the control components are mounted in the control compartment 17 which is an airtight enclosure completely sealed to prevent entry of dust, oil, water or other foreign matter in the area containing the control components. The enclosure 17 includes the inner cover member 22 and an outer cover member 68 which is substantially a hollow cylindrical member having a cavity 69 therein. The inner cover member 22 is suitably secured to the left end of housing 11 and the cover member 68 is secured to the housing 11 in encircling relation with the inner cover member 22, and the periphery of the inner cover member 22 engages the interior surface of cavity 69 and provides an airtight seal therebetween.

The inner cover member 22 is preferably made of aluminum and is a generally dish-shaped circular member opening toward the right, that is, towards the housing 11, and includes a centrally located hub portion 70, a first projecting portion 71 extending downwardly from the hub portion, and a second projecting portion 72 which extends upwardly from the hub portion 70, as viewed in FIG. 1, and toward housing 11. Extending toward the housing 11 from the periphery of the portion 71 is a cylindrical surface portion 74 which is provided with an opening 75 extending therethrough. The opening 75 extends partially around the periphery of the portion 71 of the inner cover member 22 and a plurality of cooling fins 76 are secured to the surface 71a of the portion 71 of the inner cover member and are positioned relative to the opening 75 so that air flowing through the opening 75 will flow over and in contact with surface 71a and between and past the plurality of cooling fins 76. The surface 71a and a surface 72a of portion 72 are inclined relative to the horizontal toward housing 11 and direct the air which flows through opening 75 toward the right as viewed in the drawings into the housing 11.

The control components 18 aforementioned are mounted on surfaces 71b and 72b of the portions 71, 72, respectively, opposite the surfaces 71a, 72a, respectively. The transistors 61, 61' illustrated in FIG. 1, are mounted on surface 71b and are preferably of the screw type and are screwed into threaded openings in the surface 71b. The operation of the transistors generates a considerable amount of heat and the aluminum flange member 22 readily and effectively acts as a heat sink means and the air flowing through the opening 75 and past the cooling fins 76 effectively dissipates this heat so that it does not adversely affect the operation of the device.

The hub portion 70 of the inner cover member 22 comprises a hollow cylindrical member projecting away from the housing 11 and having an opening 77 facing the housing 11. The bearing 29 which supports shaft 16 is supported in the opening 77. The portion 70a of the hub 70 remote from the housing 11 engages the inner surface 68a of cover member 68 and adds rigidity to the compartment 17.

The lower portion of cover member 68, as viewed in FIG. 1, is provided with a portion 83 which extends toward the housing member 11 beyond the line of engagement between the portion 71 of inner cover member 22 with interior surface of cavity 69. The portion 83 extends coextensively with the aforementioned portion 74 of the inner cover member 22 and is provided with an opening 84 which corresponds with and is aligned with the opening 75 in the portion 74 of the inner cover member 22. It should now be apparent that the aforementioned opening 34 consists of the two aligned openings 75, 84.

Air for cooling the electromagnetic device flows into the housing 11 through the openings 34 and 35 as above described, and the air which flows through the opening 34 moves past and between the cooling fins 76 and is directed by the dish-shaped inclined contour including surfaces 70a, 71a of the inner cover member 22 into the interior of the housing 11 and in and around the motor 14 and coupling device 15. The air which flows through the opening 35 in a like manner is directed into the interior of the housing 11 and around the coupling 15. The air then flows from the housing 11 through the louvered covers 38 secured to the lower portion of the housing 11.

Although the coupling device of this invention has been illustrated and described herein to a somewhat detailed extent, it will be understood, of course, that the invention is not to be regarded as being correspondingly limited in scope but includes all changes and modifications coming within the terms of the claims hereof.

Having described my invention, I claim:

1. In a device of the class described, a housing having support bearing means therein, relatively rotatable driven and driving shaft members supported by said bearing means, electromagnetic coupling means in said housing including a field coil and operable to transmit torque from said driving shaft member to said driven shaft member in response to energization of said field coil, energizing circuit means for said coil including control means for controlling coil excitation, said housing having an air inlet for a flow of cooling air thereinto, and heat sink means comprised at least in part by a portion of said housing and supporting said control means, said heat sink means having a surface portion extending from said air inlet toward the axis of rotation of said shaft members and angularly toward the coupling means in said housing and disposed in said flow of cooling air for dissipating heat generated by said control means and directing the air flow towards the interior of said housing.

2. The device defined in claim 1 wherein said heat sink means comprises a member positioned at one end of said housing and provided with a hollow hub portion which receives and rotatably supports one of said shaft members.

3. The device defined in claim 1 wherein said heat sink means comprises a disk shaped inner cover means on one end of said housing and said control means is mounted on said inner cover means on the side thereof facing generally axially outward of the housing, and the device further comprises an outer cup shaped cover means enclosing said control means and secured in sealing cooperation with said inner cover means and providing with the latter a substantially airtight compartment for said control means.

4. In a device of the class described, a housing having an electromagnetic device therein, a shaft driven by said electromagnetic device, electrical control means for controlling said electromagnetic device, means providing at least one air inlet for directing a flow of cooling air into said housing, heat sink means positioned at one end of said housing and supporting said electrical control means, said heat sink means having a hollow hub portion which receives and rotatably supports said shaft, and a plurality of fins supported by the surface of said heat sink means opposite the surface supporting said electrical control means and extending therefrom into said flow of cooling air for dissipating heat generated by said control means.

5. In a device of the class described, a housing having an electromagnetic device therein, electrical control means for controlling said device, means providing at least one air inlet for directing a flow of cooling air into said housing, heat sink means positioned at one end of said housing and having a first surface facing said housing and a second surface opposite said first surface for supporting said electrical control means, a plurality of fins extending from said first surface of said heat sink means into said flow of cooling air for dissipating heat generated by said control means, and a hollow end cover member encompassing said second surface of said heat sink means and secured in a position relative to said heat sink means having an airtight seal therebetween and providing an airtight compartment for said control means.

6. The device defined in claim 5 wherein said means for providing said air inlet includes a portion of said heat sink means projecting from said first surface and having an opening therein, and a part of said end cover member having an opening therein in alignment with the opening in said portion of said heat sink.

7. In a device of the class described a housing having an electromagnetic device therein, electrical control means for controlling said device, heat sink means positioned at one end of said housing remote from said electromagnetic device and supporting said electrical control means, means providing at least one air inlet adjacent said heat sink means for directing a flow of cooling air into said housing, and a plurality of fins extending from said heat sink means into said flow of cooling air for dissipating heat generated by said control means, said heat sink means having a surface portion extending from said air inlet opening toward the center of said housing angularly toward the electromagnetic device in said housing from which said fins extend and which directs the flow of air into said housing.

8. An electromagnetic coupling comprising a housing supporting relatively rotatable driven and driving shaft members, electromagnetic coupling means in said housing including a field coil and operable to transmit torque from said driving shaft member to said driven shaft member in response to energization of said field coil, energizing circuit means for said coil including control means for controlling coil excitation, heat sink means positioned at one end of said housing remote from said coil and supporting said electrical control means on one surface thereof, means providing an air inlet opening in said housing adjacent said heat sink means for directing a flow of cooling air into said housing, said opening being positioned between said heat sink and said coupling means and adjacent to a second surface of said heat sink opposite said first surface and extending from adjacent the inlet opening toward the center of said housing and angularly toward the electromagnetic coupling means in said housing, and a plurality of fin members supported on said second surface and extending axially therefrom into the flow of cooling air entering said housing through said air opening for dissipating heat generated by said control means.

9. An electromagnetic coupling device as defined in claim 8 further including a cover member enclosing said one surface of said heat sink and having a portion projecting axially beyond said fin members toward said coupling means, said air inlet opening being provided at least in part by an opening in said projecting portion of said cover means.

10. An electromagnetic coupling as defined in claim 9 wherein said housing includes a main housing member and said heat sink includes a rim portion engageable with the end of said main housing member and having an opening therein in alignment with the opening in said end cover and said fins project into the opening in said heat sink and into alignment with the opening in said cover whereby the flow of cooling air is directed through the openings in said heat sink and cover and across said angular surface and fins.

References Cited in the file of this patent

UNITED STATES PATENTS 1,708,000    Uggla ------------------ Apr. 9, 1929

FOREIGN PATENTS 1,098,720    France ---------------- Mar. 9, 1955
1,230,669    France ---------------- Apr. 4, 1960